UNITED STATES PATENT OFFICE.

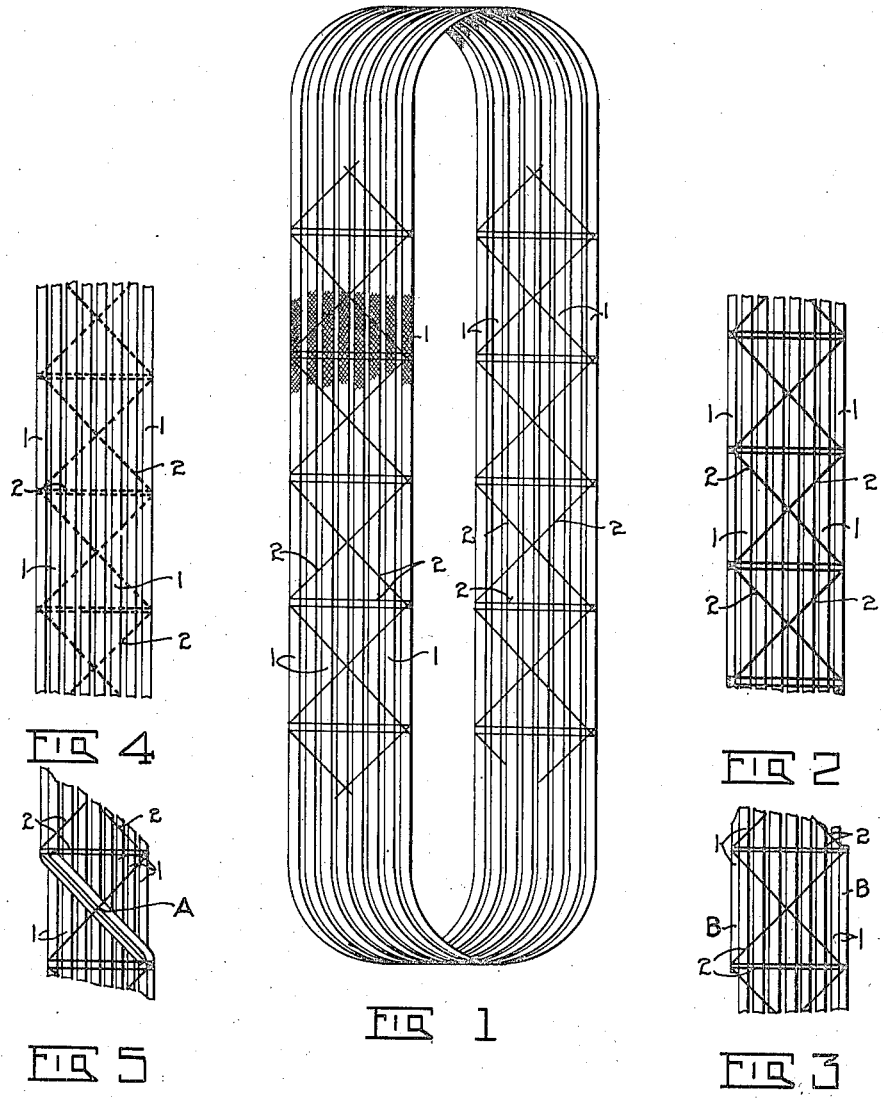

GEORGE WYLLS LEA, OF CALGARY, ALBERTA, CANADA.

CONTINUOUS-CORD BELT.

1,321,110.   Specification of Letters Patent.   Patented Nov. 11, 1919.

Application filed July 23, 1918. Serial No. 246,381.

*To all whom it may concern:*

Be it known that I, GEORGE WYLLS LEA, a subject of King George of Britain, residing at 1648 Third Ave. S. W., in the city of Calgary, in the Province of Alberta, in the Dominion of Canada, have invented a new and useful Improvement in Continuous-Cord Belts, of which the following is a specification.

My invention relates to improvements in a cord belt in which a continuous cord is wound around the drive and driven pulleys until there are sufficient strands to transmit the power from the drive to the driven pulleys, and the objects of my invention are, first, to provide a belt that will conform to the surfaces of the pulleys, second, to equalize the strain and spread it over the entire width of the belt so as to give a greater driving power to the belt, and thirdly, to provide a belt that will not stretch and cause slipping with the consequent loss of power.

I attain these by the device illustrated in the accompanying drawing, in which—

Figure 1, is a view showing the cord wound and secured so as to give permanence of shape. Fig. 2, is a detail view showing the method of securing the strands of the cord. Fig. 3, is a detail showing a method of securing the ends of the cord, and Fig. 5, shows another method of securing the ends of the cord. Fig. 4, is a view showing another method of securing the strands by means of stitching through the middle of the cord.

Similar numbers refer to similar parts throughout the several views.

To construct a cord belt of the type shown, a continuous cord 1 is wound around and around a form of sufficient dimensions until the desired width is obtained to transmit the required power, the strands being secured by stitching across the width of the belt, and the ends being secured to the belt, either by joining back as shown at "B" in Fig. 3, or the ends may be crossed over and stitched as shown at "A" in Fig. 5.

The strands of the cord are secured by stitching 2, which said stitching is continuous, perpendicularly across the belt and also diagonally, the finished stitching having the appearance of squares with the diagonals joined. By this method the strands of the cord are allowed to give slightly so as to conform to the shape of the pulleys without subjecting any one strand to a greater strain than any other strand. The total length of the cord being constant by reason of the ends being secured, no elongation of the belt across its total width is possible, as is the case with a solid flat belt where the pull may be confined to a very small fraction of the total width and the joint, always the weakest point in a belt, is liable to give out. The strands 1, being of a continuous cord there is no joint to give out and the cord of which the belt is made can be of any desired weight.

Having thus described my invention, what I claim is—

1. A continuous cord belt composed of a cord wound to the desired length and width continuously around and around a frame for the purpose of manufacture, the cord composed of any material suitable for the transmission of power, and stitching for holding the cord windings in position to secure permanence of shape and allowing slight movement of the windings longitudinally so as to equalize the strain throughout the entire width of the belt all substantially as described.

2. A continuous cord belt constructed of a cord wound to the desired length and width continuously around and around a frame for the purpose of manufacture, the cord composed of any material suitable for the transmission of power, and stitching for holding the cord windings in position to secure substantial permanence of shape leaving fractional spaces between the windings for the purpose of ventilation, cooling and smooth running and at the same time allow slight movement of the windings longitudinally so as to equalize the strain throughout the entire width of the belt, all substantially as described.

GEORGE WYLLS LEA.

Witnesses:
W. P. MAJOR,
WILFRID J. GRAY.